March 26, 1957 L. C. FOSTER 2,786,582
SEMI-AUTOMATIC PICK-UP ATTACHMENT
FOR TRACTORS AND THE LIKE
Filed Aug. 30, 1955
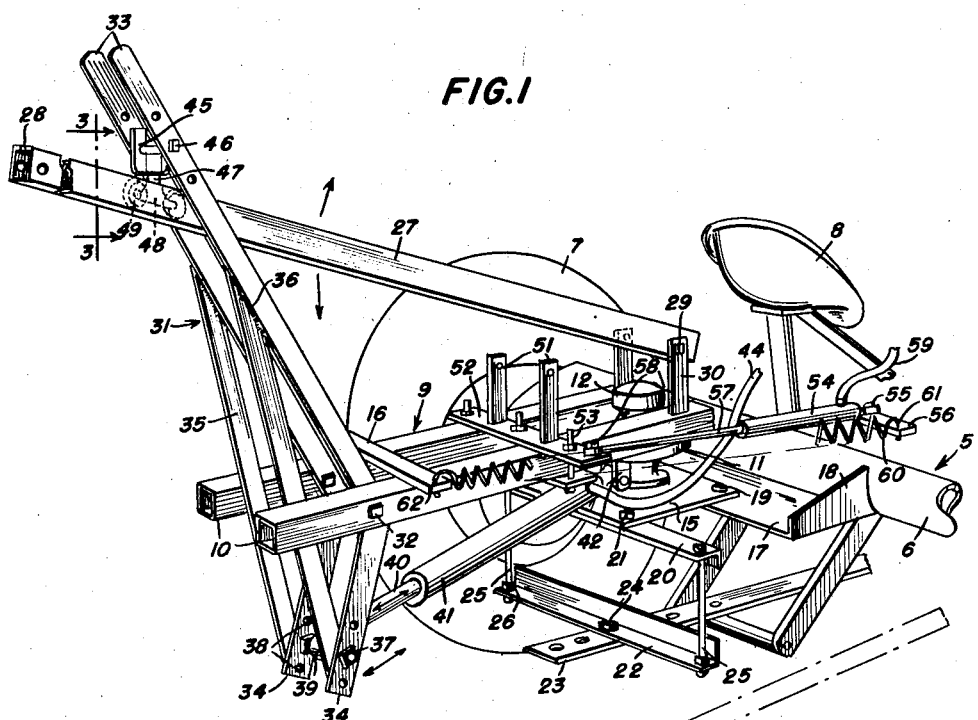
FIG.1
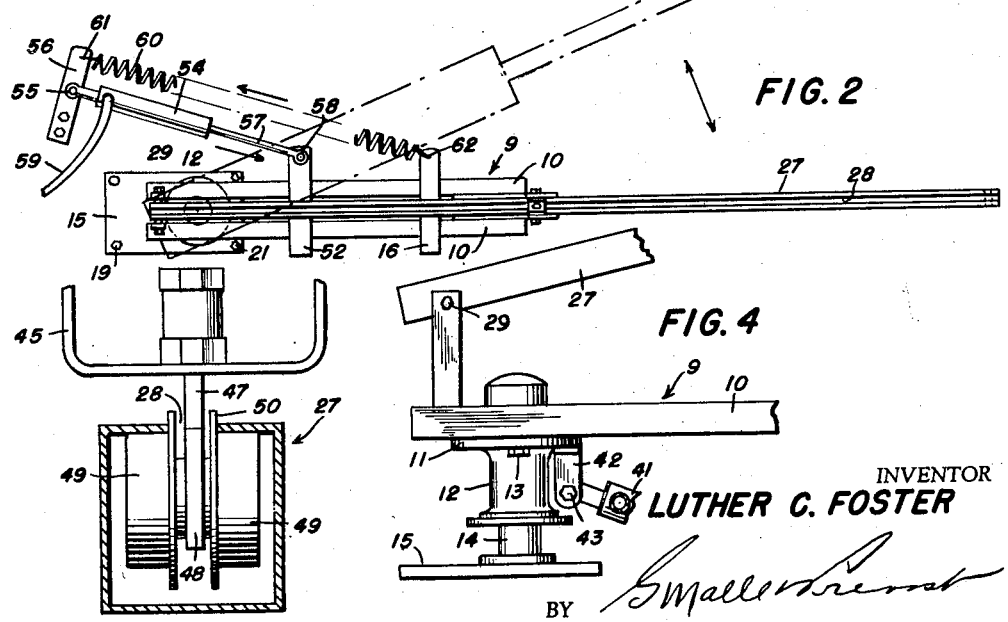
FIG.2
FIG.3
FIG.4
INVENTOR
LUTHER C. FOSTER
BY
ATTORNEY

United States Patent Office 2,786,582
Patented Mar. 26, 1957

2,786,582

SEMI-AUTOMATIC PICK-UP ATTACHMENT FOR TRACTORS AND THE LIKE

Luther C. Foster, Dearborn, Mo.

Application August 30, 1955, Serial No. 531,559

6 Claims. (Cl. 212—35)

This invention relates to portable material lifting and transferring equipment and consists more particularly in new and useful improvements in a semi-automatic pick-up attachment for use in connection with tractors, trucks and other automotive equipment.

The primary object of the invention is to provide a pick-up attachment which may be readily installed on a conventional tractor or the like without requiring any structural modifications in the tractor itself.

Another object of the invention is to provide an attachment for tractors of conventional design, said attachment comprising a boom which is pivotally mounted for vertical movement about a horizontal axis and for rotary movement about a vertical axis whereby bales of hay in a field, for example, may be lifted off of the ground and automatically transferred to an accompanying wagon.

A further object of the invention is to provide an attachment of this character which may easily be operated by one man through the conventional hydraulic control mechanism normally forming standard equipment of a tractor.

Another object of the invention is to provide a novel and improved interconnection between the leverage mechanism and boom of a pick-up attachment for tractors.

Still another object of the invention is to provide a semi-automatic pick-up attachment which is adapted to be operatively connected to the standard hydraulic system of conventional tractors.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figure 1 is a perspective view of the improved pick-up attachment in place on the rear end of a conventional tractor.

Figure 2 is a top plan view on a reduced scale, showing two different lateral positions of the pick-up boom.

Figure 3 is an enlarged sectional view taken on line 3—3 of Figure 1, showing the roller carriage connection between the hydraulically controlled operating lever and the pick-up boom; and Figure 4 is an enlarged detail showing the pivotal mountings of the pick-up frame and boom.

In the drawings, 5 generally represents the rear end of a conventional tractor including a cross frame member 6, wheels 7, and a seat 8. The main supporting frame of the improved pick-up mechanism is generally represented by the numeral 9 and consists of a pair of laterally spaced, parallel supporting bars 10. At one end, each of the bars 10 is fixed to the flange 11 of a pivot housing 12, by means of bolts or the like 13, one bar being on either side of the housing 12. The housing 12 is rotatably mounted on a vertically projecting axis 14, fixedly mounted on a supporting plate or platform 15 as will later appear. The opposite ends of the spaced bars 10 are maintained in fixed relation by means of a cross strip 16 which may be welded or bolted to the upper sides of the respective bars 10.

The supporting plate 15 may be mounted in any convenient manner on the tractor or other automotive vehicle 5, the arrangement shown in Figure 1 being simply illustrative of one form of mounting on a conventional tractor. In this particular form the tractor frame 6 is provided with a rearwardly projecting platform 17 which is welded to the frame 6 and provided with upstanding reinforcing flanges 18 at either end. The plate 15 overlies the rear edge of the platform 17 and is bolted thereto as at 19, the opposite edge of the plate being supported on a cross angle 20 to which it is bolted as at 21. The cross angle 20 may be supported in any suitable way such, for example as by a second cross angle 22 carried by the draw bar 23 of the tractor to which it is bolted as at 24. The two cross angles 20 and 22 are vertically spaced and lie parallel to one another and are maintained in fixed relation by vertical bolts or the like 25 at opposite ends, said bolts being provided with lock nuts or lugs 26 to jointly form a supporting frame extending vertically from the draw bar 23.

The pick-up boom 27 consists of a channel member having a restricted longitudinally extending slot 28 on its upper side which as will later appear, serves as a guiding trackway for a trolley mechanism carried by the elevating lever. A suitable structure for the boom 27 and one which is readily available, is the conventional trolley track employed for hanging conventional sliding barn and garage doors, but arranged with the guide slot on the topside instead of the bottom.

One end of the boom 27 is pivotally mounted as at 29, between two upright supports 30 welded or otherwise secured at the top sides of opposed supporting bars 10 on the frame 9. A leverage mechanism generally indicated by the numeral 31 is pivotally mounted between the opposite ends of the supporting bars 10 by means of transverse pivot bolts 32, whereby the leverage mechanism is adapted to swing in a vertical arc about a horizontal axis supported by the frame 9. Preferably, the leverage mechanism 31 consists of a pair of parallel transversely spaced lever arms 33 which extend on opposite sides of the boom 27 with their lower ends pivotally connected at 32, to the adjacent ends of lower arms 34 which are directed at a rear angle and extend a predetermined distance below the frame 9. In order to lend support to the angular structure of the combined arms 33 and 34, brace members 35 are welded to the under edges of the upper arms 33 as at 36, with the lower extremities connected to the lower arms 34 by a transversely extending pivotal connection 37 between the spaced lower arms 34. The angular relationship of the arms 33 and 34 may be adjusted by means of a series of aligned openings 38, whereby the position of the pivotal connection 37 and braces 35 on the arms 34, may be varied.

A pivot head 39 carried by the pivotal connection 37 is fixed to one end of a piston rod 40, the opposite end of which carries a piston or plunger (not shown) arranged for longitudinal reciprocation in a hydraulic cylinder 41. One end of the cylinder 41 is pivotally mounted on a depending ear 42 as shown at 43 in Figure 4, the ear 42 being rigidly fixed to the underside of the flange 11 of the pivot housing 12.

A flexible hydraulic line 44 leads from the interior of the forward end of cylinder 41 and is connected to the conventional hydraulic system and controls of the tractor 5, so that hydraulic pressure may be selectively introduced into the cylinder 41 to force the plunger and its piston rod 40 outwardly, thereby rocking the leverage mechanism 31 in clockwise direction as viewed in Figure 1.

One of the advantageous features of the present invention which greatly facilitates its effectiveness and ease of operation, resides in the connection between the leverage mechanism 31 and the boom 27. As best seen in Figures 1 and 3, this connecting assembly consists of a substantially U-shaped yoke 45, pivotally supported as at 46 between the free ends of the upper lever arms 33. A roller carriage hanger 47 is fixed to the yoke 45 and suspended from the underside thereof where it penetrates the longitudinally extending guide slot 28 in the upper side of the boom 27. The lower end of the hanger 47 forms a substantially T-shaped roller support 48, lying longitudinally within the channel forming the boom 27 and carrying two longitudinally spaced pairs of rollers 49. As best seen in Figure 3, the flanges 50 of the rollers 49 ride within the guide slot 28 in the upper side of the boom 27 with the peripheries of the respective rollers in engagement with the adjacent edges of the channel 27 on either side of the slot 28.

Thus, the rocking movement of the leverage mechanism 31 on its axis 32, is translated to the pivotal movement of the boom 27 on its axis 29. In other words, with the application of hydraulic power from connection 44 to the cylinder 41, the piston rod 40 through its pivotal connection to the lower arms 34 of the leverage mechanism, rocks the upper arms 33 in clockwise direction and elevates the outer end of the boom 27, as the rollers carried by the leverage mechanism, travel downwardly along the guide track 28 on the boom. Upon the release of the hydraulic pressure from the cylinder 41, the weight of the boom 27 causes the counterclockwise rotation of the leverage mechanism 31, permitting the outer end of the boom to descend. It may be noted that the cross arm 16 is so positioned on the frame 9 as to limit the clockwise rotation of the leverage mechanism so as to prevent the free ends of the arms 33 from approaching too closely the dead center of the axis 32 of the leverage mechanism 31.

In order to adapt this pick-up mechanism for lifts of various heights, it may be desirable to provide a second or supplemental pivotal mounting 51 longitudinally spaced from the pivotal supports 30 on the frame 9. As seen in Figure 1, these supplemental supports 51 are fixed to a cross bar 52 which is connected to the frame by means of bolts or the like 53. Thus, when it is desired to extend the lift of the boom 27, the pivoted end 29 of the boom is simply shifted from the upright supports 30 to the upright supports 51, thereby changing the relationship of the axis of the boom 27 with respect to the frame 9 and the leverage mechanism 31.

As previously stated, this pick-up mechanism is designed to pivot about the vertical axis 14 through the mounting of the frame 9 on the pivot housing 12. This is accomplished by means of a second hydraulic cylinder 54, pivotally mounted at one end as at 55 to a cross member 56 rigidly secured to the tractor 5 by any suitable means. A piston rod 57 extending from a plunger (not shown) within the cylinder 54, is pivotally connected at 58 to the cross arm 52. A second hydraulic line 59 leads from the interior of the cylinder 54 to the conventional hydraulic system and controls of the tractor 5. A coil spring 60 is connected at one end 61 to the cross arm 56 and at its opposite end to the cross arm 16, as at 62, said spring being under a normal tension which opposes the force created by the hydraulic cylinder 54. Thus, when hydraulic power is introduced into the cylinder 54 to rotate the frame 9 in clockwise direction about its vertical axis 14, the spring 60 is extended but as soon as the hydraulic pressure is released from the cylinder 54, the spring 60 returns the frame and the components supported thereby, to their normal positions.

Any conventional hydraulic system and controls may be employed for operating this pick-up mechanism. For example, many tractors have as standard equipment, two hydraulic cylinders operated by a single control lever through a delayed action valve. With such an arrangement, the operation of the control lever actuates one cylinder which becomes fully extended before the other cylinder is set into operation. My improved pick-up mechanism may be very easily installed for operation by such a system so that upon operation of the hydraulic control lever the cylinder 41 is first actuated to elevate the boom 27 and upon the completion of the extension of the plunger rod 40 the second cylinder 54 is set into operation to rotate the frame 9 and the boom 27 about the vertical axis 14, to deposit a load carried by the boom, onto an accompanying truck or wagon. During this latter swinging movement, the hydraulic pressure is of course maintained within the cylinder 41 until the load is deposited in the wagon. Then, upon release of pressure the reverse operation takes place, with the spring 60 returning the frame 9 to its normal position and gravity lowering the boom 27.

It will thus be seen that I have provided a very efficient and easily controlled mechanism for lifting and transferring materials and one which is particularly adapted for various farm uses with a minimum of manpower required.

From the foregoing it is believed that the invention may be readily understood by those skilled in the art without further description, it being borne in mind that numerous changes may be made in the details disclosed without departing from the spirit of the invention as set forth in the following claims.

What I claim and desire to secure by Letters Patent is:

1. In a loading attachment for tractors and the like, a supporting frame, means for detachably mounting said frame on a tractor, a boom pivotally mounted at one end on said frame for vertical movement about a horizontal axis, a longitudinally extending trackway on said boom, a leverage device pivotally mounted on said frame on a parallel axis spaced longitudinally from said first axis, fluid pressure actuated means for imparting pivotal movement to said leverage device, a roller hanger carried adjacent one end of said leverage device, roller means supported by said hanger and movably engaging said trackway for longitudinal shifting movement with respect to said boom, whereby the pivotal movement of said leverage device is progressively translated into pivotal movement of said boom.

2. A loading attachment as claimed in claim 1, wherein said frame is mounted on said tractor for pivotal movement about a vertical axis and fluid pressure actuated means for imparting pivotal movement to said frame about said axis.

3. A loading attachment as claimed in claim 1, wherein said boom comprises an elongated channel, said trackway being formed by a longitudinally extending, transversely restricted slot in the upper side of said boom.

4. In a loading attachment for tractors and the like, a supporting frame comprising a pair of laterally spaced, parallel bars, means detachably mounting said frame on a tractor, a boom, consisting of an elongated channel member having a restricted, longitudinally extending slot in its upper side, means pivotally mounting said boom on said frame, for vertical movement about a horizontal axis, a leverage device pivotally mounted on said frame on a parallel axis spaced longitudinally from said first axis, fluid pressure actuated means for imparting pivotal movement to said leverage device, a roller hanger carried by said leverage device and extending through said restricted slot in said boom, rollers supported by said hanger and disposed within said channel for movable engagement with respect to said slot, whereby the pivotal movement of said leverage device is progressively translated into pivotal movement of said boom.

5. A loading attachment as claimed in claim 4, wherein said frame is provided with a supplemental pivot point for said boom, whereby the fulcrum of the latter may be adjusted.

6. A loading attachment as claimed in claim 4 including means for adjusting the angle of leverage of said leverage device and means for adjusting the position of said roller hanger with respect to said leverage device.

References Cited in the file of this patent

UNITED STATES PATENTS

| | | |
|---|---|---|
| 363,066 | Harris | May 17, 1887 |
| 2,502,108 | Taylor | Mar. 28, 1950 |
| 2,674,500 | Hukari | Apr. 6, 1954 |
| 2,702,137 | Ives | Feb. 15, 1955 |